May 3, 1949.  H. L. BROCK ET AL  2,468,809
TRACTOR RADIATOR GRILLE
Filed May 27, 1947

C. F. KRAMER
H. L. BROCK
INVENTORS

BY

ATTORNEYS.

Patented May 3, 1949

2,468,809

UNITED STATES PATENT OFFICE 2,468,809

TRACTOR RADIATOR GRILLE

Harold L. Brock, Detroit, and Clarence F. Kramer, Birmingham, Mich., assignors to Ford Motor Company, Dearborn, Mich., a corporation of Delaware Application May 27, 1947, Serial No. 750,820

4 Claims. (Cl. 180—69)

This invention relates generally to a tractor, and more particularly to a grille construction for the radiator of a tractor.

Tractors used for agricultural purposes generally are powered by an internal-combustion engine mounted near the front of the tractor, and the radiator for cooling the engine is mounted in an upright position forwardly of the engine at the extreme front end of the tractor. While this, of course, is the most advantageous position for the radiator since it receives the maximum air for cooling purposes, it is nevertheless subject to the disadvantage that it may receive and collect substantial quantities of foreign matter which may clog the radiator and cause overheating by preventing the admission of the requisite quantities of cooling air. In certain types of agricultural work, for example, literally clouds of dirt and other material are thrown into the air in the path of the tractor.

In many modern tractor designs, the radiator is afforded some protection by the use of a covering hood, sheet metal side panels on opposite sides of the radiator, and a radiator grille spaced slightly forwardly of the radiator and mounted so as to cover the opening formed between the hood and the side panels. In addition to providing some protection for the radiator, this construction greatly enhances the appearance of the tractor. However, since the grille must necessarily be louvered so as to provide minimum obstruction to the passage of air through the radiator, a considerable quantity of dirt and other foreign matter is permitted to pass through the grille and to become lodged upon the radiator itself. After a certain amount of material has accumulated upon the radiator, it is necessary to clean the radiator to prevent malfunctioning of the cooling system. In present tractors this can be accomplished only by means of a long-handled brush or other implement which must be inserted from beneath the grille. This is necessarily a tedious and unsatisfactory operation.

It is therefore an object of the present invention to overcome the difficulties mentioned above and to provide a tractor in which the radiator can be readily and easily cleaned, and yet in which the protection and attractive appearance afforded by the combination of the radiator grille, side panels, and hood is not sacrificed. This is accomplished in the present instance by providing a separate grille assembly, designed to fit within the space formed by the side panels and the hood, and which is pivotally mounted along one edge so that it can be readily swung to open position to provide access to the radiator.

Other objects of the invention include providing means in connection with the pivotal mountings for the radiator grille to hold the grille in a substantially horizontal position when the latter is opened and to prevent it from falling to the ground; and to provide manually operable means which are largely concealed from view for locking the grille in its closed position.

Other advantages and objects of the invention will be made more apparent as this description proceeds, particularly when considered in connection with the accompanying drawings wherein.

Figure 1:
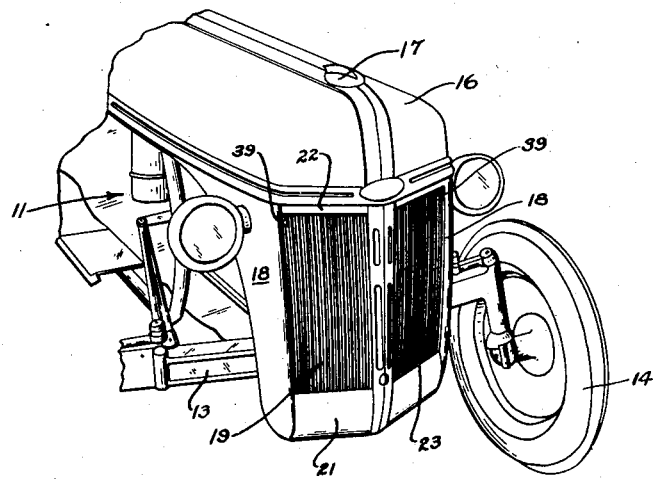
Figure 1 is a fragmentary perspective view of the front portion of a tractor embodying the invention, and showing the grille in its closed position.

Referring now more particularly to the drawings, there is shown a tractor having an engine 11, a radiator 12, front axle 13, and front wheels 14. The radiator 12 is of conventional type and is mounted in an upright position adjacent the front of the tractor forwardly of the engine. It is suitably connected to the engine to provide a complete cooling system therefor.

A sheet metal hood 16 is supported above the engine and extends forwardly to cover the top of the radiator 12. A suitable filler cap 17 is provided on the hood to enable the radiator to be filled. In the present instance the hood 16 is fixed, access being had to the engine at the open sides thereof. Extending downwardly from the sides of the hood at the forward end thereof are a pair of sheet metal side panels 18. These side panels are arranged on opposite sides of the radiator 12 and extend slightly forwardly thereof. It will be seen that the sides and top of the radiator are protected by the side panels and the hood, and also that the side panels and the hood define an opening for receiving the radiator grille 19.

The radiator grille 19 comprises a lower panel 21, an upper channel shaped bar 22 and a plurality of ribs 23 arranged vertically in laterally spaced relationship and connected at their opposite ends to the lower panel 21 and the channel shaped bar 22, respectively. It will be seen from Figure 1 that the radiator grille thus formed fits within the opening formed by the side panel and the hood and is substantially flush therewith to provide a smooth exterior appearance.

Figure 4:
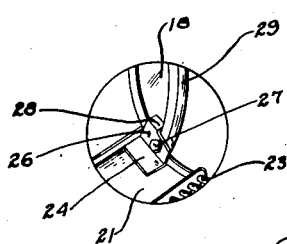
Figure 4 is a fragmentary enlarged elevational view illustrating particularly one of the brackets on the lower part of the grille.
Figure 2:
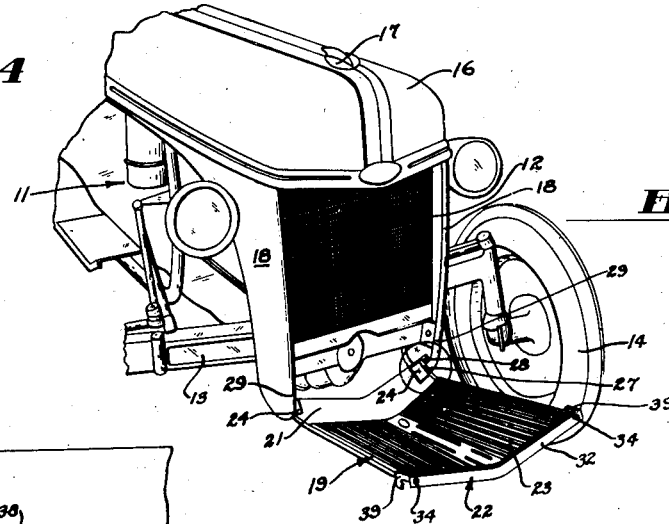
Figure 2 is a perspective view similar to Figure 1 but showing the grille in its open position.

As best seen in Figures 2 and 4, reinforcing brackets 24 are spot-welded to the inner surface of the lower panel 21 of the grille at opposite sides thereof. The brackets 24 are formed with flanges 26 extending longitudinally and supporting bolts 27 which pass through the lower portions of the side panels 18 and form pivotal connections for the grille. The bolts 27 at opposite sides of the grille are arranged in alignment with each other, and the grille can therefore be swung about this axis from the closed position shown in Figure 1 to the open position shown in Figure 2. In its open position, the grille is held in a substantially horizontal position and prevented from falling to the ground by means of lugs 28 extending laterally outwardly from the flanges 26 formed on the bracket 24. These lugs are arranged to engage the forward rolled edges 29 of the side panels 18 to arrest the downward movement of the grille.

Figure 3:
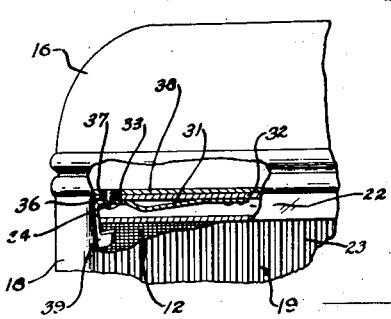
Figure 3 is a fragmentary enlarged front elevational view, partly broken away, of the front of the tractor illustrating particularly the latch means.

Means are provided adjacent the upper edge of the radiator grille for locking the grille in its upright or closed position. This means comprises a spring latch 31 carried within the channel shaped bar 22 adjacent each side edge of the grille. Inasmuch as the two latches are identical in construction, only one will be described in detail. As best seen in Figure 3, each spring latch 31 comprises a strip of spring steel riveted at its inner end to the lower side of the top flange 32 of the channel shaped bar 22. Intermediate its end the latch member 31 is bowed downwardly to provide the requisite resiliency, and then continues into a flat portion 33 adjacent its outer edge. The flat portion 33 is apertured to receive a short plunger 34 which is riveted thereto and which extends freely through a hole 36 formed in the top flange 32 of the channel shaped bar 22. The engagement between the plunger 34 and the hole 36 guides the spring latch 31 and maintains the plunger in alignment with a hole 37 formed in the flange 38 which is bent inwardly from the lower edge of the forward portion of the hood 16. A downwardly and forwardly extending flange 39 is provided at the laterally outer end of the spring latch 31 to provide means for operating the latch. It will readily be seen that to open the grille it is only necessary to press downwardly upon the flanges 39 of the spring latches 31 to withdraw the plungers 34 from the holes 37 in the flanges 38 of the hood. The grille can then be swung downwardly to the position shown in Figure 2, providing access to the radiator 12 and permitting the latter to be easily cleaned and all foreign matter accumulated thereon readily removed. In addition, radiator repairs are facilitated. In closing the grille, the flanges 39 can of course be held down to permit the plungers 34 to readily pass beneath the flange 38 of the hood, but this is not necessary since the plungers will strike the rolled forward edge of the hood to automatically force the spring latches and the plungers down to clear the hood, after which they snap into place in the holes 37.

From the foregoing it will be seen that the general appearance of the tractor is enhanced and protection afforded by the grille, side panels and hood, and yet access can readily be had to the space between the grille and the radiator for the purpose of cleaning from the radiator foreign matter infiltrating through the grille.

Although we have shown and described certain embodiments of the invention, it will be understood that we do not wish to be limited to the exact construction shown and described, but that various changes and modifications may be made without departing from the spirit and scope of our invention, as defined in the appended claims:

What is claimed is:

1. In a tractor having an internal-combustion engine and a cooling radiator therefor mounted in an upright position adjacent the front of the tractor, a sheet metal hood extending over said engine and said radiator, side panels extending downwardly from said hood on opposite sides of said radiator and defining with said hood a generally rectangular opening, a grille covering said opening and having pivotal connections adjacent its lower edge with said side panels to permit said grille to be swung from a substantially vertical closed position to a substantially horizontal open position exposing said radiator for cleaning purposes, spring urged latch means adjacent the upper edge of said grille at opposite sides thereof for releasably holding said grille in closed position, and lugs at the lower edge of said grille adjacent and spaced radially from the axis of said pivotal connections, said lugs being arranged to engage portions of said side panels when said grille has been lowered to a substantially horizontal position to hold the grille in that position.

2. In a tractor having an internal-combustion engine and a cooling radiator therefor mounted in an upright position adjacent the front of the tractor, a generally horizontal sheet metal hood extending over said engine and said radiator and terminating forwardly of said radiator, sheet metal side panels extending downwardly from the forward portion of said hood on opposite sides of said radiator and defining with said hood a generally rectangular opening located forwardly of said radiator and corresponding generally in size to the size of said radiator, said hood and said side panels being stationary and rigidly mounted upon said tractor, a grille covering said opening and pivotally mounted along one edge thereof to said tractor, and manually releasable fastening means at the opposite edge of said grille to secure the grille in a closed position and to permit the grille to be swung to open position to expose said radiator.

3. The structure defined by claim 2 which is further characterized in that the grille has pivotal connections adjacent its lower edge with said side panels to permit the grille to be swung from a substantially vertical closed position to a substantially horizontal open position exposing said radiator for cleaning purposes, said fastening means comprising a pair of laterally spaced spring urged latch means mounted upon the upper edge of the grille and releasably engageable with the forward portion of said stationary hood to selectively hold said grille in closed position.

4. The structure defined by claim 2 which is further characterized in that said grille is provided adjacent its lower edge with rearwardly extending side flanges at each side of the grille, pivotal connections between the rearwardly extending flanges and said stationary side panels to permit said grille to be swung from a substantially vertical closed position about the transverse axis at the lower edge of said grille through said pivotal connections to a substantially horizontal open position exposing said radiator for cleaning purposes, and laterally outwardly extending lugs projecting from said flanges and engageable with portions of said stationary side panels when said grille has been lowered to a substantially horizontal position to the hold the grille in that position.

HAROLD L. BROCK.
CLARENCE F. KRAMER.

REFERENCES CITED

The following references are of record in the file of this patent:

UNITED STATES PATENTS

| Number | Name | Date |
|---|---|---|
| 251,645 | Scherer | Dec. 27, 1881 |
| 2,084,572 | Breer | June 22, 1937 |

FOREIGN PATENTS

| Number | Country | Date |
|---|---|---|
| 553,185 | Great Britain | May 11, 1943 |